(No Model.)
W. A. PERRY.
HOOK FOR FASTENING ROPE.
No. 371,475. Patented Oct. 11, 1887.
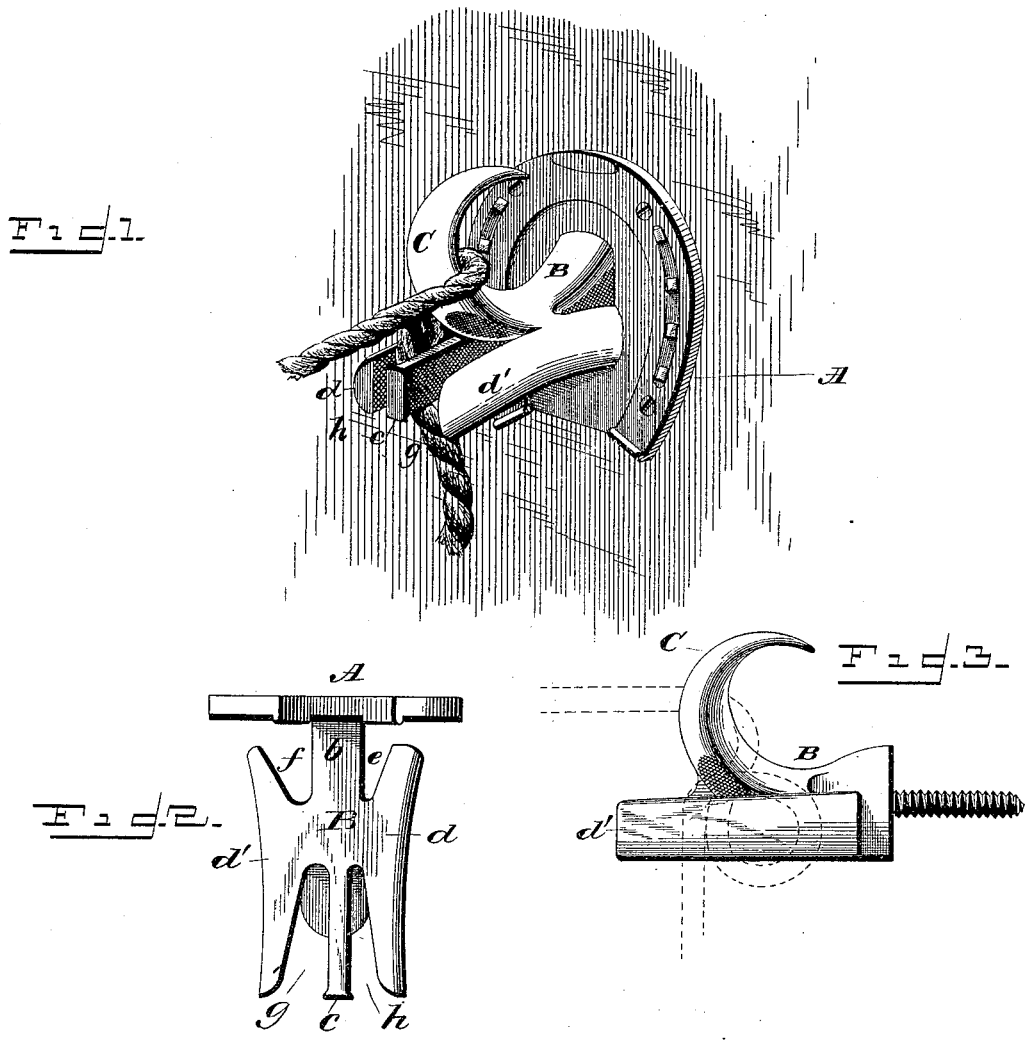
WITNESSES
G. S. Elliott
E. W. Johnson
Walter A. Perry
INVENTOR
Attorney

UNITED STATES PATENT OFFICE.

WALTER A. PERRY, OF NEW BEDFORD, MASSACHUSETTS.

HOOK FOR FASTENING ROPE.

SPECIFICATION forming part of Letters Patent No. 371,475, dated October 11, 1887.

Application filed May 19, 1887. Serial No. 238,783. (No model.)

*To all whom it may concern:*

Be it known that I, WALTER A. PERRY, a citizen of the United States of America, residing at New Bedford, in the county of Bristol and State of Massachusetts, have invented certain new and useful Improvements in Hooks for Fastening Rope; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in devices for fastening the ends of rope without forming knots in the same, the same being designed more especially for fastening the ends of rope used for clothes-lines and other analogous purposes; and my invention consists in a hook and fastening device, the construction of which will be hereinafter fully set forth, and specifically pointed out in the claims.

In the accompanying drawings, which illustrate my invention, Figure 1 is a perspective view of a rope hook or clamp constructed in accordance with my improvement. Fig. 2 is an inverted plan view, and Fig. 3 is a side view.

A refers to the back plate or base of the rope-fastening device, which is preferably of some ornamental configuration, said back plate being provided with openings, through which screws may pass for attaching the same to a suitable support. Instead of employing a back plate, I may use a screw, as shown in Fig. 3, which will be formed integral with the rope-clamping device.

B refers to the body of the rope-fastening device, which is connected to the back plate or support by the shank $b$, and from this shank projects a central member, $c$. On each side of the shank $b$ and projecting member $c$ are formed side cleats, $d$ and $d'$, wedge-shaped openings being formed between the edges of the aforesaid portions, these wedge-shaped openings being indicated by the letters $e$, $f$, $g$, and $h$, and the sides of these wedge-shaped openings are preferably corrugated or roughened. It will be observed that the wedge shaped openings hereinbefore referred to are of different sizes, so as to receive rope of different diameters.

C refers to an upwardly-projecting hook, which is formed integral with the parts hereinbefore mentioned, said hook being rounded on its inner side, so that the rope may pass freely over the same.

When the device is used as a fastening for clothes-lines, the clothes line or rope is first passed over the hook C, the device having been previously attached to a suitable support, and the rope is then drawn taut, after which it can be brought down through one of the wedge-shaped recesses, so as to hold the rope secure, the wedge-shaped recess corresponding nearly to the size of the rope being selected, by preference, in order that the rope may lie closely within the crotch. As additional security, the rope may be passed through another of the wedge-shaped openings.

The under side of the hook, immediately above the recesses $g$ and $h$, is corrugated on its under side, so that the rope, when passed under this portion of the hook to one of the rear wedge-shaped recesses, $e$ or $f$, will be jammed between the bottom of the hook and the upper edges of the cleats. By this construction I provide a means whereby one or more ropes may be stretched or secured upon a single fastening device and released without interfering with each other, and from which the rope can be readily detached when desired, the hook providing a convenient means for stretching the rope prior to fastening.

It will be observed, as all the parts of my improvement are rigid with respect to each other, that it can be cheaply and effectively made of a single casting.

I claim—

1. As a new article of manufacture, a rope-fastener consisting of a shank terminating at rear in a base and provided at the sides with cleats $d$ $d'$ and at top with a hook, a forwardly-projecting member, $c$, being arranged between the forward ends of the cleats, substantially as described.

2. As a new article of manufacture, a rope-fastener consisting of a shank terminating at rear in a base and forward in a projecting member, c, cleats d d', arranged on each side of the shank to leave wedge-shaped openings e, f, g, and h, and a hook rising from the upper side of the shank, the inner faces of the openings and lower bend of the hook being corrugated or roughened, substantially as described.

In testimony whereof I affix my signature in presence of two witnesses.

WALTER A. PERRY.

Witnesses:
WALTER CLIFFORD,
HENRY H. CRAPO.